(12) United States Patent
Berg et al.

(10) Patent No.: US 6,507,540 B1
(45) Date of Patent: Jan. 14, 2003

(54) HYBRID OPTICAL HEAD FOR DATA STORAGE

(75) Inventors: John Berg, Bellingham, MA (US); Roger A. Hajjar, San Jose, CA (US)

(73) Assignee: Terastor Corporation, Milpitas, CA (US)

( * ) Notice: Subject to any disclaimer, the term of this patent is extended or adjusted under 35 U.S.C. 154(b) by 132 days.

(21) Appl. No.: 09/653,526

(22) Filed: Aug. 31, 2000

Related U.S. Application Data

(60) Provisional application No. 60/151,617, filed on Aug. 31, 1999.

(51) Int. Cl.[7] .............................................. G11B 11/00
(52) U.S. Cl. ................................. 369/13.13; 369/13.33
(58) Field of Search ........................... 369/13.13, 13.33, 369/13.32, 13.24, 112.01; 300/313, 324, 328

(56) References Cited

U.S. PATENT DOCUMENTS

| | | | |
|---|---|---|---|
| 5,197,050 A | * 3/1993 | Murakami et al. ............ | 369/13 |
| 5,881,042 A | * 3/1999 | Knight ......................... | 369/99 |
| 6,130,864 A | * 10/2000 | Burroughs ..................... | 369/13 |
| 6,160,769 A | * 12/2000 | Ohnuki et al. ................. | 369/13 |
| 6,256,267 B1 | * 7/2001 | Hatam-Tabrizi .............. | 369/13 |
| 6,351,436 B1 | * 2/2002 | Mallary ........................ | 369/13 |

\* cited by examiner

*Primary Examiner*—Tan Dinh
(74) *Attorney, Agent, or Firm*—Fish & Richardson P.C.

(57) ABSTRACT

An optical read/write head system having a support structure, an optical coupling element and a magnetic data coupling element is disclosed. The optical coupling element is provide on the support structure and is configured to couple optical signal to and from a recording medium. The magnetic data coupling element is also provided on the support structure and is configured to couple magnetic signal to and from the recording medium. The two elements operate in combination to provide more effective reading and writing than with either element alone.

19 Claims, 5 Drawing Sheets

HYBRID OPTICAL HEAD FOR DATA STORAGE

CROSS-REFERNCE TO RELATED APPLICATION

This application claims the benefit of the priority of U.S. Provisional Application No. 60/151,617, filed on Aug. 31, 1999, and entitled Hybrid Optical Head for Data Storage.

BACKGROUND

The present disclosure generally relates to data storage systems such as disk drives and more specifically, to a read/write head for use in optical and magneto-optical data storage systems to enable hybrid transduction of data from, and to a storage medium.

A conventional data storage system may include a magnetic head that has a slider element and a magnetic read/write element. The system may also be coupled to a rotary actuator magnet and a voice coil assembly by a suspension and an actuator arm positioned over a surface of a spinning disk. In operation, a lift force may be generated by the aerodynamic interaction between the magnetic head and the spinning disk. The lift force is opposed by equal and opposite spring forces applied by the suspension such that a predetermined flying height is maintained over a full radial stroke of the rotary actuator assembly above the surface of the spinning disk.

Flying head designs have been proposed for use with optical and magneto-optical (MO) storage technology. One motivation for using the magneto-optical technology stems from the availability of higher areal density with magneto-optical storage disks than magnetic storage disks. However, despite the historically higher areal storage density available for magneto-optical disk drives, the prior art magneto-optical disk drive volumetric storage capacity has generally not kept pace with the volumetric storage capacity of magnetic disk drives.

SUMMARY

In recognition of the above-described difficulties, the inventors recognized the need for high-resolution, high-density reading and writing on data storage media.

The present disclosure describes an optical read/write head system having a support structure, an optical coupling element and a magnetic data coupling element. The optical coupling element is provide on the support structure and is configured to couple optical signal to and from a recording medium. The magnetic data coupling element is also provided on the support structure and is configured to couple magnetic signal to and from the recording medium. The two elements operate in combination to provide more effective reading and writing than with either element alone.

BRIEF DESCRIPTION OF THE DRAWINGS

Different aspects of the disclosure will be described in reference to the accompanying drawings wherein.

DETAILED DESCRIPTION

The present disclosure describes a hybrid-type head design 100 arranged to provide high-resolution, high-density reading and writing. The hybrid head 100 utilizes both optical and magnetic couplers to couple optical and magnetic signals to a recording medium.

Figure 1A:
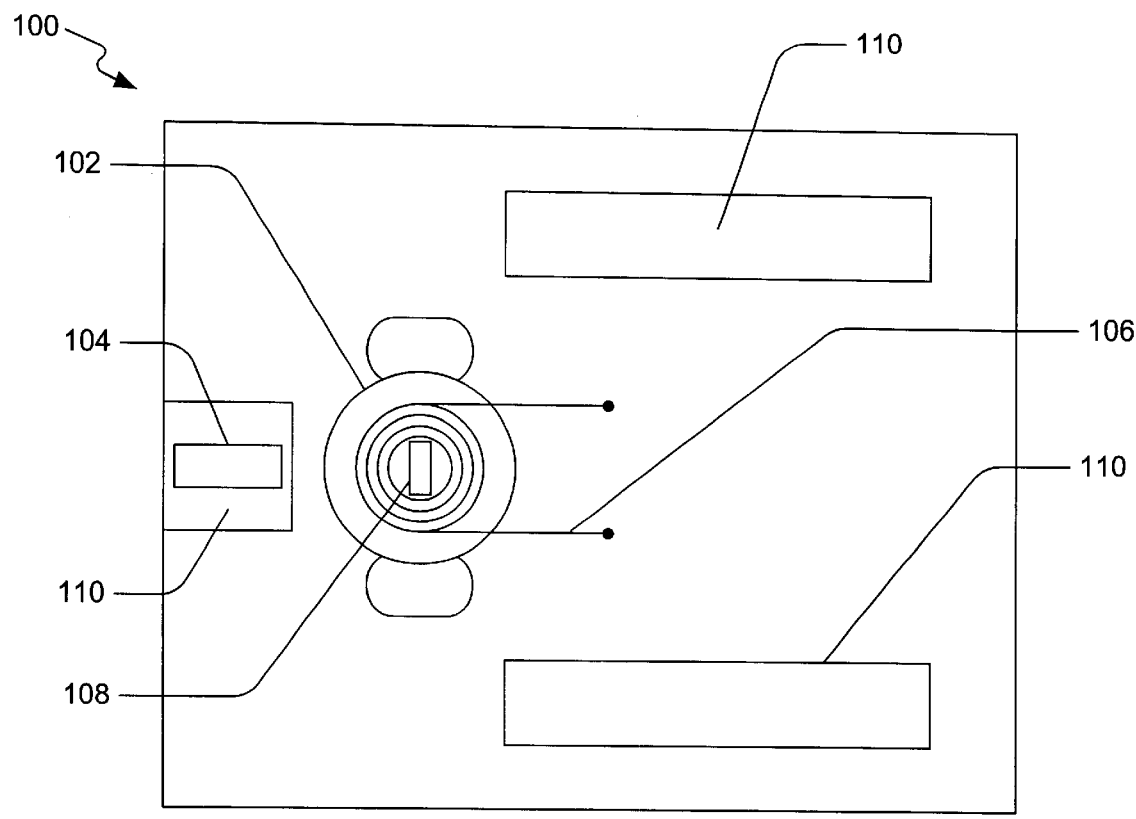
FIGS. 1A and 1B illustrate a hybrid-type head design in accordance with an embodiment of the present system.
Figure 1B:
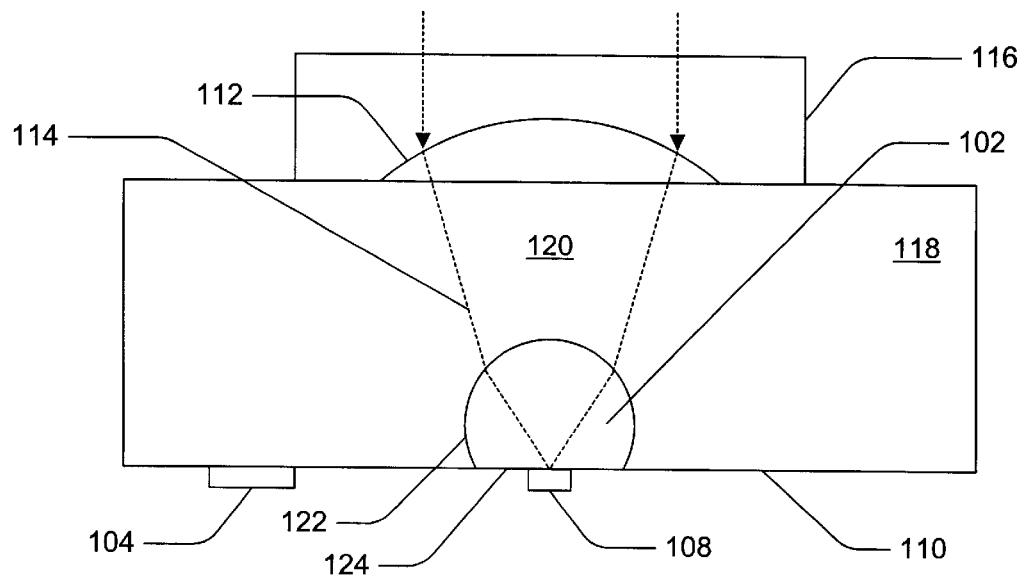

FIGS. 1A and 1B illustrate an embodiment of the hybrid head design 100 viewed from the bottom and the side, respectively. The hybrid head 100 includes an objective lens 112, a solid-immersion lens (SIL) 102 and a closely spaced magneto-resistive (MR) head 104.

SIL lens 102 and inductive coil 106 may provide near-field recording on a recording material. The coil 106 produces a magnetic field having a component perpendicular to the recording media at the location where the light beam is focused. The magnetic field produced by the coil 106 may also be precisely focused at the location where the light beam is focused.

The constituent optics may include a reflector 116, an objective lens 112, and a solid immersion lens 102. Each of these may be mounted to the slider 118. The SIL may be substantially or entirely contained within the slider 310. The objective lens 112 is mounted onto or near the top surface of the slider 118 to focus the incident electromagnetic radiation 114, such as a laser beam, onto the SIL 102. An optical clear path 120 is provided between the SIL 102 and the objective lens 112 so that the electromagnetic radiation may be effectively transmitted from one to the other and back again. The optical clear path 120 may include any optically transparent material, and may be air, glass, optically clear plastic, and so on.

The electromagnetic radiation 114 traveling through the optical clear path 120 may be incident on the partial spherical surface 122 of the SIL. The SIL 102 may be a single partial sphere or a lesser portion of a partial sphere plus a flat plate. The SIL 102 generally has a spherical portion 122 and a flat portion 124, which may be a flat surface or a flat plate. The flat portion 124 may be generally co-planar with the air-bearing surface 110. The flat portion 124 may also be in the vicinity of the air-bearing surface 110 and preferably parallel thereto. For a hemispherical SIL, the vicinity may be about the range of the dimensional tolerance of the hemispherical SIL, which may be about tens of microns. for a typical hemispherical SIL. For a super-hemispherical SIL, the vicinity may be about less than 1 micron. Such geometry may assist the flight of the head 100 over the recording medium, and forms part of the total slider-air bearing surface.

The optical beam 114 at the exit of the flying head is tightly focused, and may be for example in the sub-micron range. Therefore, the bottom flat surface of a near-field lens 102 may be etched, ion-milled or cut away to form a mesa-like structure 108, or tapered bottom may be used to allow small coil 106 to be formed about the focused beam.

The focused beam is thus converged near the mesa structure 108. In near-field recording, the recording medium is located less than a wavelength away from the flat portion 124 of the SIL lens 102 and the mesa structure 108. In this way, the evanescent waves of the incident wave may couple the optical energy at the small focused spot. Thus, the flying head 104 is "suspended" over the optical medium at a constant distance through air-bearing surfaces 110.

Alternatively, the recording medium may be in a far-field position relative to the SIL 102. In such a case, the medium would be located more than a wavelength away from the flat portion 124 of the SIL lens 102 and the mesa structure 108. In a far-field configuration, the head 100 would have to be positioned above the recording medium by a servo since no air-bearing surface is created in this situation.

The MR head 104 may provide magneto-resistive reading of the written bits while the magnetic super-resolution (MSR) or magneto-optic (MO) media is optically heated to open the magnetic domain for readout. The MR head 104 may allow reading of narrow tracks and very high linear bit density compared to MO head.

In an alternative embodiment, the hybrid head design may use a wide read element that covers several tracks. The MR head 104 may then detect only the data that has been coupled to the surface by the heating of the laser.

The hybrid head is located generally adjacent to a recording medium. The head may be reading data from or writing data to the recording medium. In general, the recording medium can be in any format including disk or tape. Traditional magneto-optical recording uses a transparent substrate, such as glass or polycarbonate plastic, to bring any dust or other contaminant particles on the light entrance surface severely out of focus. In one implementation, the recording medium is layered on a substrate with a reflective aluminum material provided on top of the substrate. Layers for dielectric, recording, intermediate coupling, and readout functions may then be provided in sequence. A transparent overcoat layer may be deposited on top to protect the medium.

Figure 2:
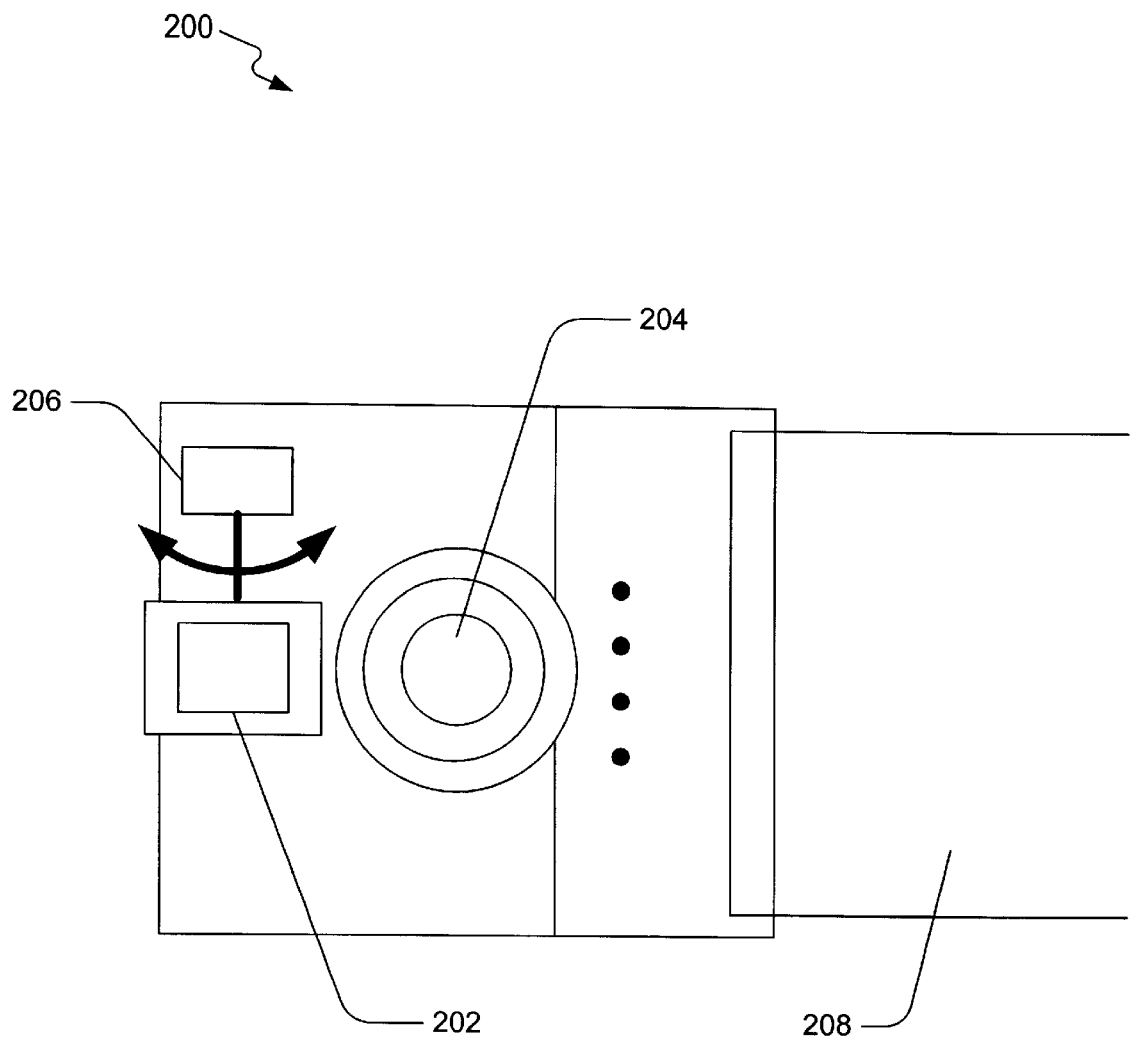
FIG. 2 illustrates an embodiment of the hybrid head design in a far-field environment.

An embodiment of the hybrid head 200 design in a far-field environment is illustrated in FIG. 2. The head design may include an MR head 202 and an objective lens 204. The design may also include an actuator/servo 206 to maintain a constant distance between the head 200 and the recording medium. The actuator 206 may be incorporated into a suspension or a slider 208.

In some embodiments, flying MO head having SIL lens may be used to pick-up MO written domains. For these embodiments, the domain size may often be limited by the resolution of the beam spot focused by the SIL lens in the MO head. Further, the signal-to-noise ration (SNR) may drop significantly as the domain size is reduced.

FIGS. 3 through 6 illustrate different hybrid head designs to improve the. resolution of the SIL system. The designs involve coating the bottom of the SIL lens with a magnetic masking and detection strip. The magnetic properties of the strip are modified as a function of exchange field from the written domains by thermally activating a small area on the SIL lens with a laser. Further, alignment between the magnetic sensor and the data may be maintained by using the same laser spot transmitted through the SIL lens for tracking.

The magnetic strip may be a single or a combination of magnetic layers with ferri- or ferro-magnetic properties. In-plane or perpendicular magnetic anisotropy may depend on the detection technique used such as magnetic super-resolution (MSR), magnetic amplifying magneto-optical system (MAMMOS), or magneto-resistance (MR). The magnetic properties of the magnetic strip such as coercivity, magnetization, and anisotropy are expected to vary as a function of temperature and exchange coupling from the written domains on the media. The thermal assistance may be provided by the laser spot, which produces a 'window' in the masking properties of the magnetic strip. This inhibits is inadvertent sensing of adjacent domains referred to as inter-symbol interference.

The read back signal may be detected by means of the Kerr effect or the magneto-resistive effect. In detecting the Kerr effect, the laser light is used to detect up or down magnetic states. For the magneto-resistive effect, an electric connection is made to the boundaries of the magnetic layer to sense the change in resistance as a function of magnetic state. A coil structure may be used around the bottom of the SIL lens in order to initialize the layer in a given direction. The structure may also be used to expand and collapse domains on the MAMMOS.

Figure 3:
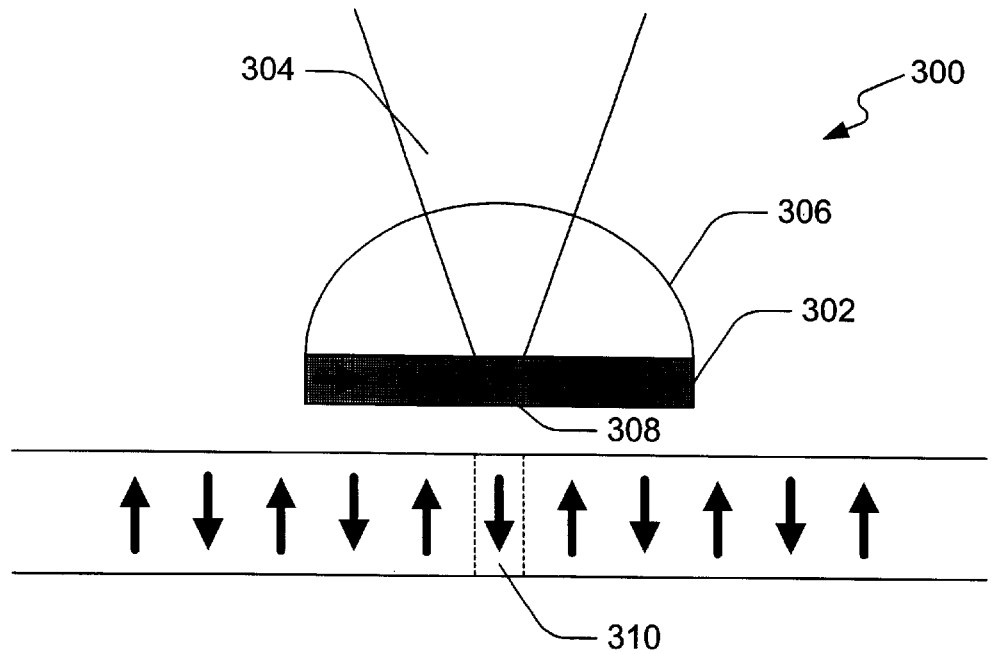
FIG. 3 shows an embodiment 300 of the present system with an MSR medium used as a magnetic strip.

FIG. 3 shows an embodiment 300 of the present system with the MSR used as a magnetic strip 302. The strip 302 may be formed of a GdFeCo layer or other suitable layer. The laser spot 304 transmitted through the SIL lens 306 thermally activates a small area 308 on the magnetic strip 302 to change the magnetization of the small area 308 in accordance with the orientation of the written domain 310 under the illuminated area. Thus, the magnetic strip 302 acts as a readout layer with the laser spot 304 providing a window in the masking properties of the magnetic strip 302 to reduce any interference.

Figure 4:
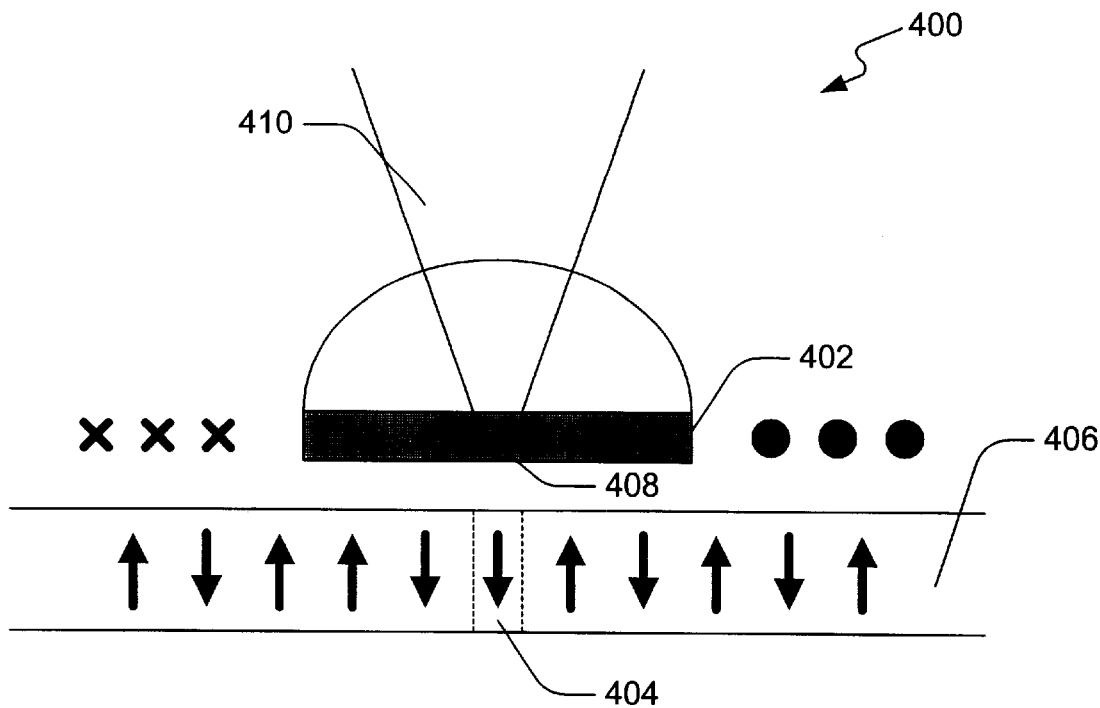
FIG. 4 shows an embodiment of the present system with a MAMMOS medium used as a magnetic strip.

An embodiment 400 of the present system with the MAMMOS used as a magnetic strip 402 is shown in FIG. 4. In the illustrated embodiment, the MAMMOS 402 is configured to amplify a signal of a domain 404 in the recording layer 406. For example, an amplifying layer of TbFeCo may be used to ensure enhanced playback of high-density recording spots, e.g., with a spot size less than 0.1 $\mu$m in diameter.

In a readout operation, a small area 408 on the MAMMOS 402 may be heated by a laser beam 410. Magnetic transformation may cause a new domain with the same magnetic orientation to form on the magnetic strip 402 of MAMMOS. The newly formed magnetic domain on the strip 402 expands if an external magnetic field is applied,in the same direction as the local magnetic orientation. This amplification improves the signal detection in readout or enhances the apparent signal-to-noise ratio of the recorded bit. A reversed external magnetic field may be applied to an amplified domain to eliminate or collapse the domain in the amplifying layer after the domain is read out and before the next domain is amplified for readout. Hence, the external magnetic field may be modulated at the data rate of the storage system.

Figure 5:
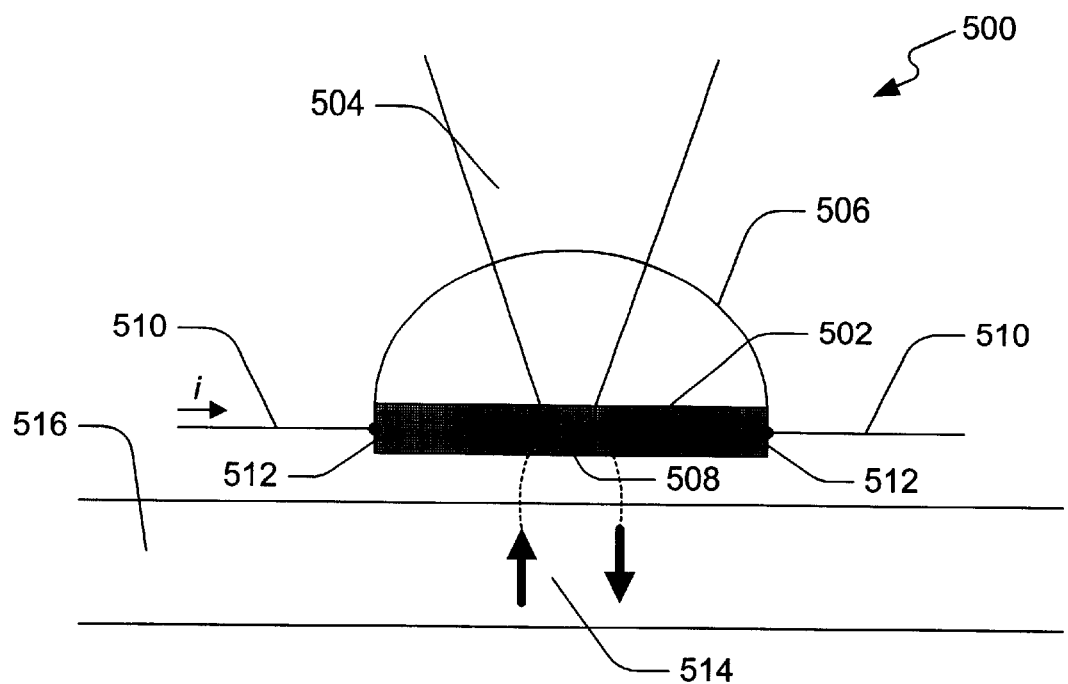
FIG. 5 shows an embodiment of the present system with giant magneto-resistive (GMR) material used as a magnetic strip.

FIG. 5 shows an embodiment 500 of the present system with giant magneto-resistive (GMR) material used as a magnetic strip 502. Again, the laser spot 504 transmitted through the SIL lens 506 thermally activates a small area 508 on the magnetic strip 502. An electrical connection 510 is made to the boundaries 512 of the magnetic strip 502 to sense the change in resistance as a function of magnetic state of the written domain 514 on the recording medium 516.

Figure 6:
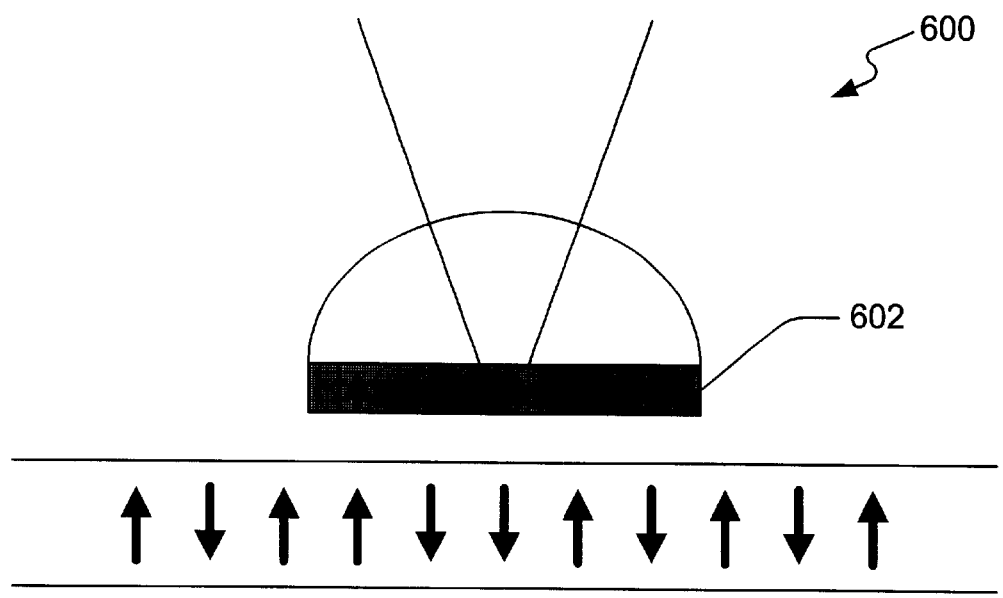
FIG. 6 shows another embodiment of the present system with GARNET transparent material used as a magnetic strip.

FIG. 6 shows another embodiment 600 of the present system with GARNET transparent material used as a magnetic strip 602. GARNET material generates high Kerr signal, which provides high signal-to-noise ratio data.

Figure 7:
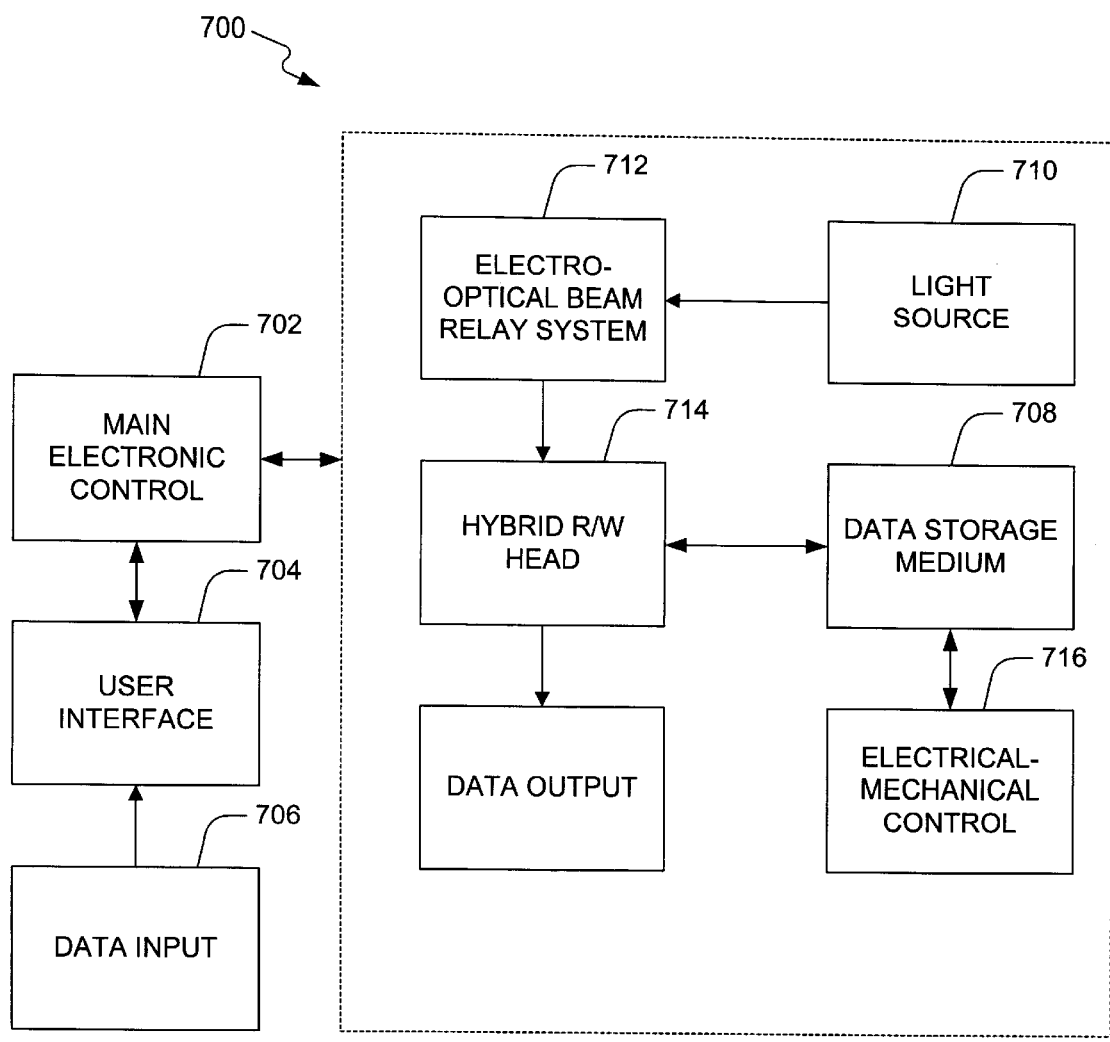
FIG. 7 is a block diagram of an optical storage system having a hybrid read/write head of the present system.

FIG. 7 is a block diagram of an optical storage system 700, which includes a hybrid read/write head 714. The system 700 provides a user interface 704 of data input 706 through main electronic control 702 which is preferably implemented to monitor and control all components and subsystems. The user interface 704 includes, but is not limited to, a computer keyboard, a display, electrical and mechanical switches and control buttons. The system 700 also includes a data storage medium 708 in the form of a disk or other format. In some embodiments, the disk is a magneto-optic disk, a write-once disk, a phase-change disk, or a read-only disk.

In one embodiment, a flying read/write head 714 and the data storage medium 708 are positioned relative to each other so that the optical spacing therebetween is less than one wavelength of the light produced by the light source 710 in a near-field configuration. An air-bearing surface is preferably implemented at the base of the flying head 714 to maintain a desired focus without conventional servo optics for focusing. Alternatively, a far-field configuration can also be used with the flying head 714, in which case the separation between the flying head and the recording layer does not allow efficient coupling of evanescent waves and thus a conventional servo focusing system is needed to directly focus the beam onto the recording surface.

In a readout operation, a reflected laser beam may be modulated with both tracking information and the data stored on the storage medium 708. In a recording operation, the reflected laser beam from the optical medium 708 may be encoded with beam-tracking information. Recording data onto the storage medium 708 may be done by either modulating a writing beam via an optical modulation including beam intensity, phase, and polarization either at the light source 710 or at the beam relay system 712, or directly modulating the state of the data storage medium 708 through thermal or magneto-resistive methods.

While specific embodiments of the invention have been illustrated and described, other embodiments and variations are possible.

All these are intended to be encompassed by the following claims.

What is claimed is:

1. A system, comprising:
   a support structure;
   an optical coupling element on said support structure configured to include a lens system to couple a laser beam to and from a recording medium and a magnetic coil positioned around said lens system to modify an orientation of data at a spot on the recording medium illuminated by said laser beam, said optical coupling element operable to read data from or write data into the recording medium; and
   a magnetic data coupling element on said support structure adjacent to said optical coupling elements configured to couple a magnetic signal to and from the recording medium,
   where said optical coupling element and said magnetic data coupling element operate in combination to provide both optical reading and writing and magnetic reading on the recording medium.

2. The system of claim 1, wherein said optical coupling element is used to record data on the recording medium by using at least said laser beam, while said magnetic data coupling element is used to read data from the recording medium by using said magnetic signal.

3. The system of claim 1, wherein said optical coupling element includes:
   an objective lens operating to guide laser beam onto a spot on the recording medium; and
   a solid immersion lens provided between said objective lens and the recording medium to provide enhanced illumination of the spot, said solid immersion lens operating in a near-field configuration such that said lens is positioned above the recording medium at a distance less than a wavelength of the laser beam.

4. The system of claim 3, wherein said magnetic coil in said optical coupling element is formed around said solid immersion lens.

5. The system of claim 1, wherein an optical surface of said lens system in said optical coupling element that couples light to and from the recording medium includes a magnetic super-resolution (MSR) layer configured to read-out data from the recording medium while mitigating interference between adjacent magnetic domains.

6. The system of claim 5, wherein said MSR layer includes a layer of GdFeCo material.

7. The system of claim 1, wherein said optical coupling element includes an optical surface in said lens system to face the recording medium for coupling light, and wherein said magnetic coil is located around said optical surface, and said magnetic coil has a center and a periphery and operates to produce a magnetic field; and
   wherein said optical surface has a layer of a magnetic amplifying magneto-optical system (MAMMOS) disposed near the center of the magnetic coil, and configured to readout data from the recording medium, said magnetic data coupling element operating to allow said optical coupling element to thermally activate an area on said MAMMOS to amplify a signal at the activated area when the magnetic field is applied in the same direction as data orientation of a domain on the recording medium under said area.

8. The system of claim 7, wherein said MAMMOS includes a layer of TbFeCo material.

9. The system of claim 1, wherein said optical coupling element includes an optical surface in said lens system to face the recording medium for coupling light, wherein said optical surface includes a giant magneto-resistive (GMR) layer configured to readout data from the recording medium according to a change in resistance of an area illuminated by the laser beam in accordance with data orientation of a domain on the recording medium under said area.

10. The system of claim 1, wherein said optical coupling element includes an optical surface in said lens system to face the recording medium for coupling light, wherein said optical surface includes a GARNET transparent layer configured to readout data from the recording medium based on a high Kerr signal in an area illuminated by the laser beam in accordance with data orientation of a domain on the recording medium under said area.

11. An optical storage system, comprising:
    a light source generating a light beam;
    an electro-optical beam relay system configured to guide said light beam;
    a data storage medium; and
    an optical read/write head system including:
        an optical coupling element configured to couple said light beam to and from said data storage medium based on a magneto-optic effect, and
        a magnetic data coupling element adjacent to said optical coupling element and configured to magnetically couple magnetic signal to and from said data storage medium,
    where said optical coupling element and said magnetic data coupling element form a hybrid structure to provide both optical reading and writing and magnetic reading on the recording medium.

12. The system of claim 11, wherein said optical coupling element includes:
- an objective lens operating to guide laser beam onto a spot on the recording medium;
- a solid immersion lens provided between said objective lens and the recording medium to provide enhanced illumination of the spot, said solid immersion lens operating in a near-field configuration such that said lens is positioned above the recording medium at a distance less than a wavelength of the laser beam; and
- a magnetic coil positioned around said solid immersion lens to modify an orientation of data at the spot on the recording medium.

13. The system of claim 12, wherein said solid immersion lens has a flat surface facing the recording medium for coupling light which has a layer of a magnetic amplifying magneto-optical system (MAMMOS) in the center of said magnetic coil.

14. The system of claim 12, wherein said solid immersion lens has a flat optical surface facing the recording medium and having a magnetic super-resolution (MSR) layer configured to readout data from the recording medium.

15. A data storage system, comprising a hybrid head for reading data from and writing data into a recording medium, said head includes:
- a slider;
- an magneto-optic head formed on said slider having an objective lens and a solid immersion lens to form a lens system to direct a laser beam received by said objective lens to the recording medium via said solid immersion lens, and a magnetic induction coil engaged around said solid immersion lens to produce a magnetic field on a surface of the recording medium for magneto-optic reading and writing; and
- a magnetic resistive head formed on said slider adjacent to said magneto-optic head to couple a magnetic signal to and from the recording medium for reading data on the recording medium.

16. The system as in claim 15, wherein said solid immersion lens includes a flat optical surface facing the recording medium to coupling light between the objective lens and the recording medium.

17. The system as in claim 16, wherein said flat optical surface includes a magnetic super-resolution (MSR) layer.

18. The system as in claim 16, wherein said flat optical surface includes a layer of a magnetic amplifying magneto-optical system (MAMMOS).

19. The system as in claim 16, wherein said flat optical surface includes a giant magneto-resistive (GMR) layer.

* * * * *